(12) United States Patent
Vastholil

(10) Patent No.: US 11,502,945 B2
(45) Date of Patent: Nov. 15, 2022

(54) HIGH-AVAILABILITY NETWORKING AS A SERVICE VIA WI-FI

(71) Applicant: Juniper Networks, Inc., Sunnyvale, CA (US)

(72) Inventor: Ashok Babu Vastholil, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/892,453

(22) Filed: Jun. 4, 2020

(65) Prior Publication Data

US 2021/0336878 A1 Oct. 28, 2021

(30) Foreign Application Priority Data

Apr. 22, 2020 (IN) .............................. 202041017253

(51) Int. Cl.
| | |
|---|---|
| *H04L 67/1095* | (2022.01) |
| *H04L 45/42* | (2022.01) |
| *H04L 41/0893* | (2022.01) |
| *H04L 9/40* | (2022.01) |
| *H04L 65/1066* | (2022.01) |
| *H04L 43/16* | (2022.01) |

(52) U.S. Cl.
CPC .......... *H04L 45/42* (2013.01); *H04L 41/0893* (2013.01); *H04L 43/16* (2013.01); *H04L 63/1425* (2013.01); *H04L 65/1066* (2013.01); *H04L 67/1095* (2013.01)

(58) Field of Classification Search
CPC ..... H04L 45/42; H04L 41/0893; H04L 43/16; H04L 63/1425; H04L 65/1066; H04L 65/1095

See application file for complete search history.

(56) References Cited

U.S. PATENT DOCUMENTS

| 9,055,067 B1 * | 6/2015 | Ward, Jr. ................ H04L 12/14 |
| 2018/0246791 A1 * | 8/2018 | Xie ..................... G06F 11/2007 |
| 2019/0335526 A1 * | 10/2019 | Wittenschlaeger ..... H04L 41/12 |

* cited by examiner

*Primary Examiner* — Ryan J Jakovac
(74) *Attorney, Agent, or Firm* — Harrity & Harrity, LLP

(57) ABSTRACT

A first network device may receive a request associated with forming a high-availability cluster with a second network device, wherein the first network device is associated with a session of a user device. The first network device may determine, based on authorization information associated with the first network device, that the first network device is authorized to form the high-availability cluster. The first network device may configure communication links with the second network device to form the high-availability cluster. The first network device may synchronize, with the second network device, session information associated with the session via the communication links. The first network device may route session traffic of the session to the second network device and a data network to enable the user device to receive a high-availability service during the session.

20 Claims, 11 Drawing Sheets

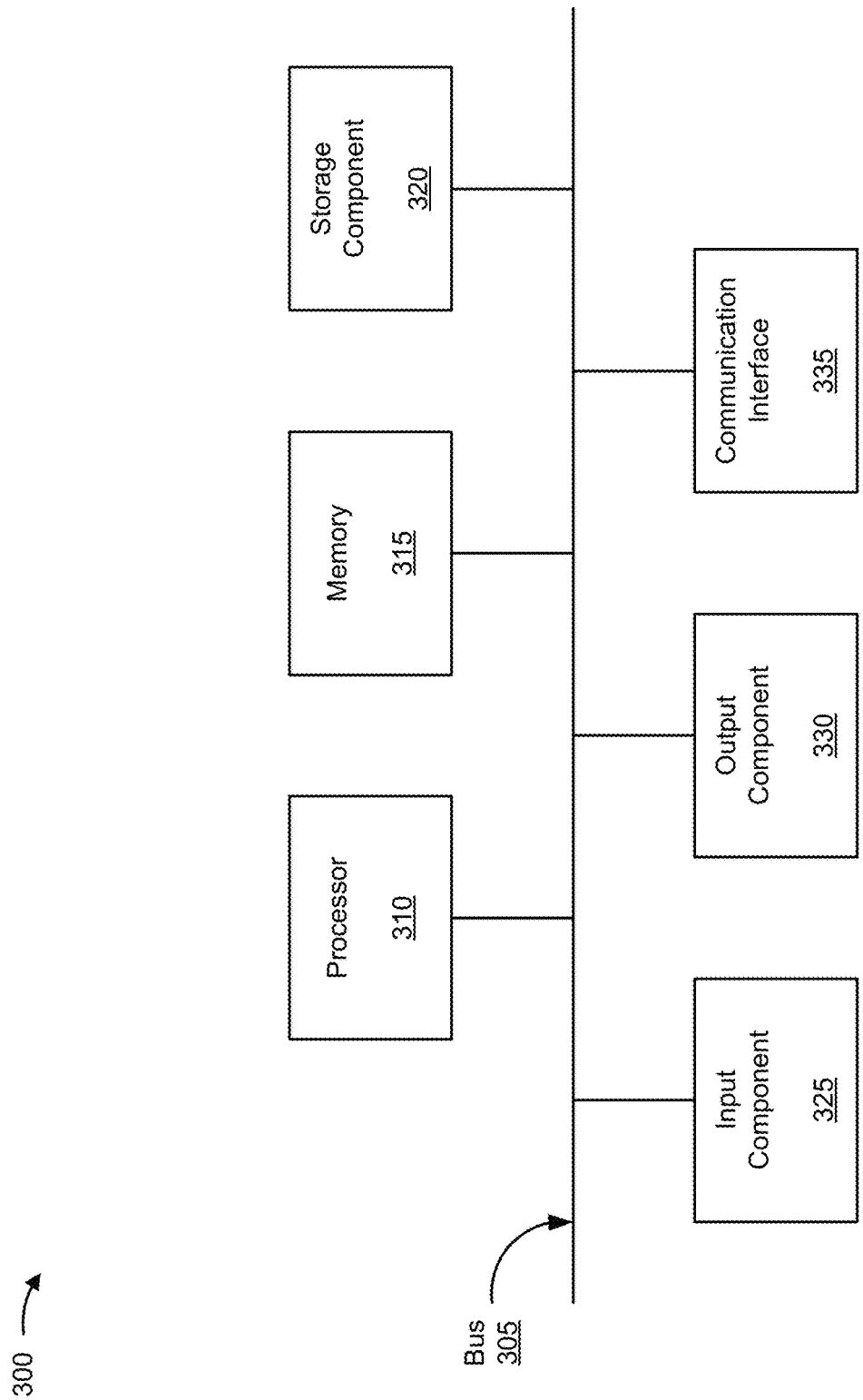

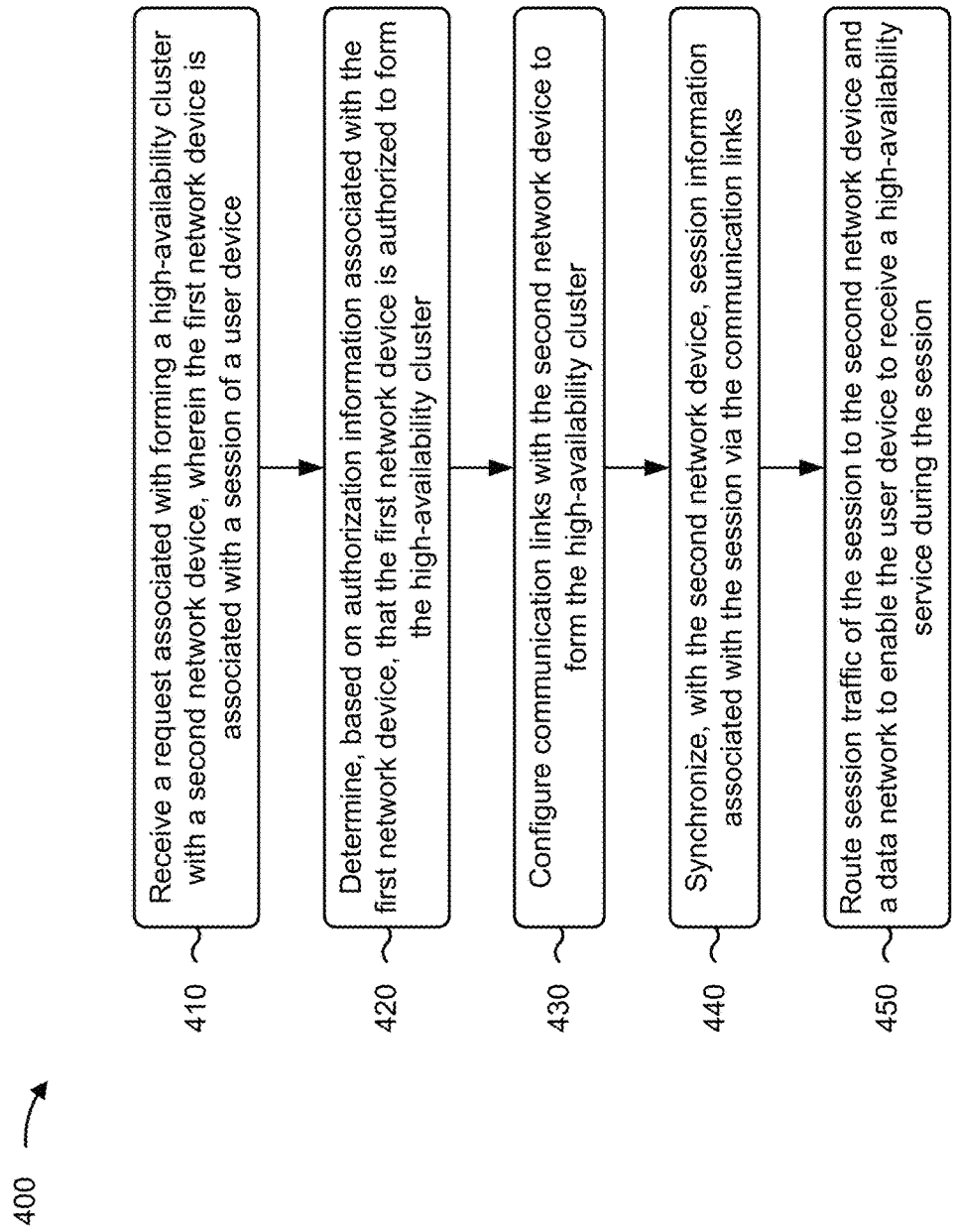

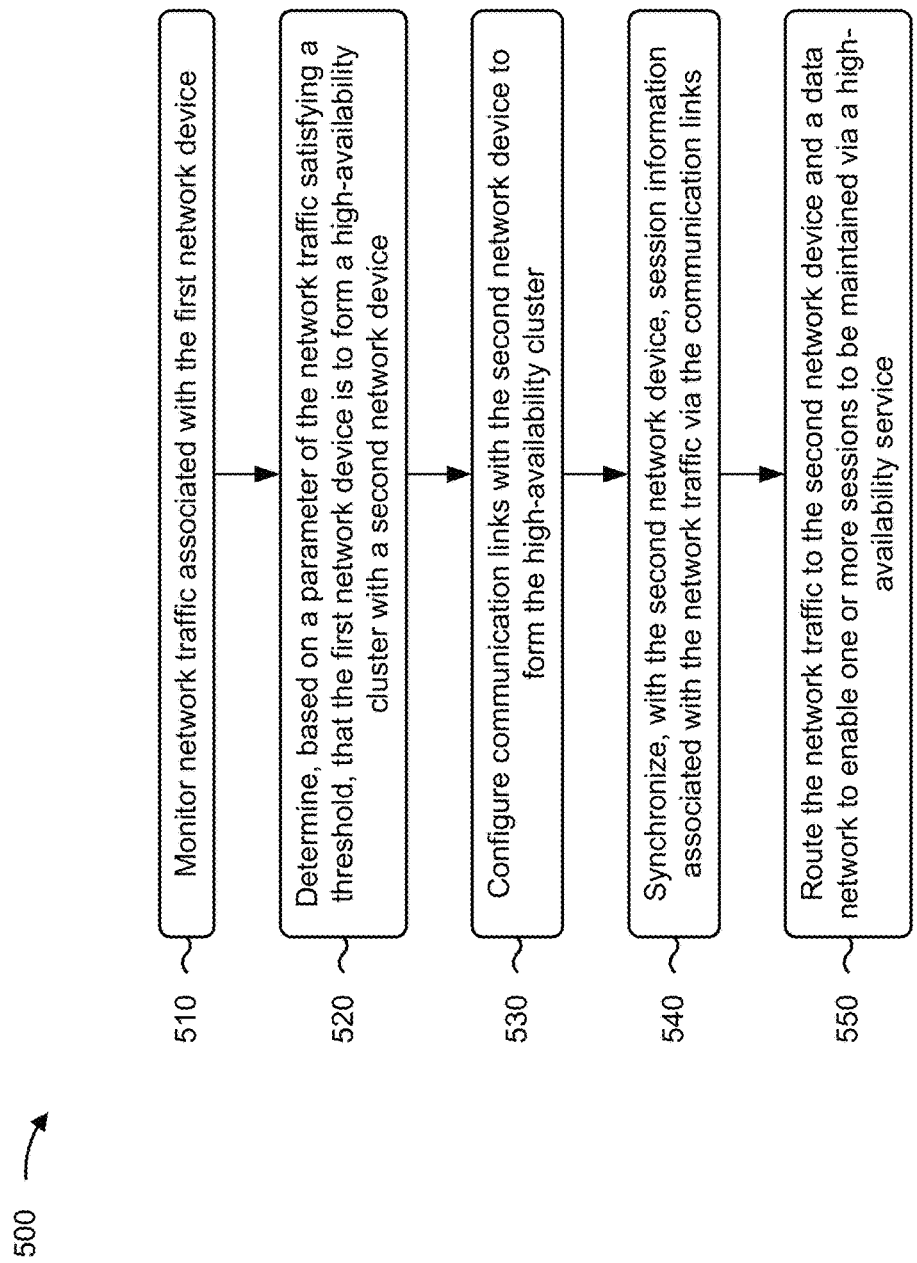

HIGH-AVAILABILITY NETWORKING AS A SERVICE VIA WI-FI

CROSS-REFERENCE TO RELATED APPLICATION

This application claims priority to Indian Provisional Application No. 202041017253 entitled "HIGH-AVAILABILITY NETWORKING AS A SERVICE VIA WI-FI," filed on Apr. 22, 2020. The entire content of which is expressly incorporated herein by reference.

BACKGROUND

A high-availability cluster may include a plurality of network devices that are linked or connected together to form a logical or virtual network device that is more resilient to faults than if the plurality of network devices were to operate in discrete configurations.

SUMMARY

According to some implementations, a method may include receiving, by a first network device, a request associated with forming a high-availability cluster with a second network device, wherein the first network device is associated with a session of a user device; determining, by the first network device and based on authorization information associated with the first network device, that the first network device is authorized to form the high-availability cluster; configuring, by the first network device, communication links with the second network device to form the high-availability cluster; synchronizing, by the first network device and with the second network device, session information associated with the session via the communication links; and routing, by the first network device, session traffic of the session to the second network device and a data network, to enable the user device to receive a high-availability service during the session.

According to some implementations, a first network device may include one or more memories and one or more processors to: monitor network traffic associated with the first network device; determine, based on a parameter of the network traffic satisfying a threshold, that the first network device is to form a high-availability cluster with a second network device; configure communication links with the second network device to form the high-availability cluster; synchronize, with the second network device, session information associated with the network traffic via the communication links; and route the network traffic to the second network device and a data network to enable one or more sessions to be maintained via a high-availability service.

According to some implementations, a non-transitory computer-readable medium may store one or more instructions. The one or more instructions, when executed by one or more processors of a first network device, may cause the one or more processors to: determine that network traffic of the first network device is to be routed via a high-availability cluster; identify a second network device that is configured to join the high-availability cluster; cause the second network device to reboot to permit the second network device to join the high-availability cluster; hand off the network traffic to the second network device; reboot to establish the high-availability cluster; configure communication links with the second network device to form the high-availability cluster; and synchronize, with the second network device, session information associated with the network traffic via the communication links to permit the network traffic to be routed via a high-availability service.

BRIEF DESCRIPTION OF THE DRAWINGS

FIGS. 3A and 3B are diagrams of example components of one or more devices of FIG. 2.

FIGS. 4-6 are flowcharts of example processes relating to high-availability networking as a service.

DETAILED DESCRIPTION

Figure 1A:
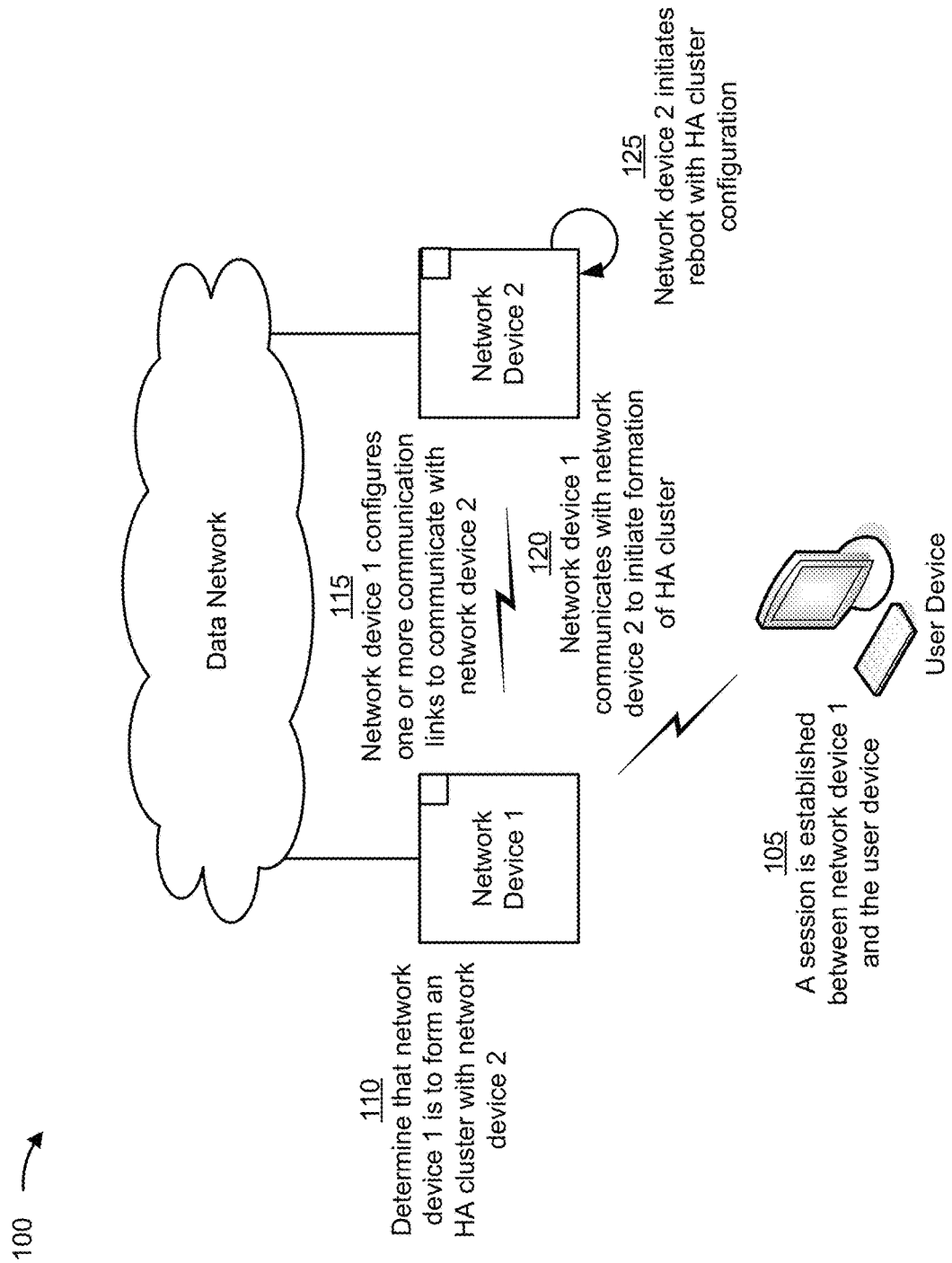
FIGS. 1A-1E are diagrams of one or more example implementations described herein.

The following detailed description of example implementations refers to the accompanying drawings. The same reference numbers in different drawings may identify the same or similar elements.

A high-availability (HA) cluster may include a plurality of network devices that are linked or connected together to form a logical or virtual network device that is more resilient to faults than if the plurality of network devices were to operate in discrete configurations. The plurality of network devices in the HA cluster may share session information associated with user device sessions such that faults in the HA cluster may be mitigated by near instantaneous failover and/or reversion of stateful network traffic.

To form an HA cluster, a plurality of network devices may be linked and/or connected via a plurality of interfaces. A control interface may provide a control link by which the plurality of network devices may exchange control traffic. A fabric interface may provide a fabric link by which the plurality of network devices may forward network traffic (e.g., traffic that is originated from and/or destined for user devices that are communicatively connected with the HA cluster).

In some cases, the control link and the fabric link may be implemented by physical network cables such as Ethernet cables, fiber cables, and/or the like. While physical network cables may provide high transfer rates and reliability, physical network cables increase the cost and complexity of deploying HA clusters, decrease the flexibility in deploying HA clusters (e.g., the physical network cables may limit the physical placement of cluster nodes in an office building), and/or the like. Moreover, in most cases, network devices that form an HA cluster are deployed as network devices for the HA cluster and not as standalone devices. This may be an inefficient use of the network devices and/or network device resources (e.g., processing resources, memory resources, power resources, and/or the like) when an HA cluster is not needed to forward network traffic Some implementations described herein provide network devices that can be configured on-the-fly as an HA cluster for a discrete purpose or for a particular amount of time. In this way, some implementations may provide HA networking as a service, which may allow for more efficient use of the network devices and/or resources of the network devices. In some implementations, the network devices may communicate via wireless control links (e.g., using respective Wi-Fi mini-physical interface modules (mPIMs), which decreases the cost and complexity of deploying the HA cluster. Moreover, the flexibility of deploying the HA cluster via wireless communication (e.g., using Wi-Fi) is increased in that the physical location of the network devices is not restricted due to a need to run physical network cables. Accordingly, the network devices may be more optimally placed (e.g., in an office building, across a campus, and/or the like) such that the wireless coverage (e.g., Wi-Fi coverage) of the HA cluster, for user devices that communicatively connect with the HA cluster, may be increased.

FIGS. 1A-1E are diagrams of one or more example implementations 100 described herein. As shown in FIGS. 1A-1E, example implementation(s) 100 include a user device, a first network device (shown as network device 1) and a second network device (shown as network device 2). The first network device and the second network device may provide a connection for the user device, and/or one or more other devices, to a data network. In some implementations, the user device, the first network device, and the second network device may be connected via a wireless network, such as a Wi-Fi network. The network devices may communicate with the user device and each other using respective mPIMs of the network devices.

As shown in FIG. 1A and by reference number 105, a session may be established between the first network device and the user device (e.g., to allow the first network device to route network traffic between the user device and the data network). In some implementations, the user device may initiate establishment of the session to allow the user device access to the data network.

As shown by reference number 110, the first network device may determine to form an HA cluster with the second network device. Additionally, or alternatively, the first network device may determine that network traffic of the session, network traffic of the first network device (e.g., network traffic of the session of the user device and/or additional network traffic), and/or the like is to be routed via an HA cluster, and therefore may determine to form an HA cluster with the second network device.

For example, the first network device may receive a request (e.g., via user input from the user device that includes the request) to form an HA cluster with the second network device, to route network traffic of the session of the user device via an HA cluster, and/or the like. The first network device therefore may determine, based on the request, to form an HA cluster with the second network device.

In another example, the first network device may monitor network traffic (e.g., network traffic of the session of the user device and/or additional network traffic) associated with the first network device. The first network device may determine, based on a parameter of the network traffic, that the first network device is to form an HA cluster with the second network device. For example, the first network device may determine that the parameter of the network traffic satisfies (e.g., is greater than or equal to) a threshold and therefore that the first network device is to form an HA cluster with the second network device. The parameter of the network traffic may be a quantity of user devices that are associated with the network traffic, a quantity of sessions that are associated with the network traffic, a performance characteristic associated with the first network device routing the network traffic (e.g., a reliability characteristic, a processing speed characteristic, a throughput characteristic, a capacity characteristic, and/or the like), and/or the like.

In some implementations, the first network device (e.g., after determining to form an HA cluster) may determine, based on authorization information (e.g., a license for the first network device to form an HA cluster as a service), that the first network device is authorized to form an HA cluster with the second network device. The first network device may obtain the authorization information from a data structure (e.g., that is included in the first network device, accessible to the first network device, and/or the like). For example, the first network device may perform a lookup process, based on determining to form an HA cluster with the second network device, in the data structure to identify the authorization information to form an HA cluster with the second network device. Additionally, or alternatively, the first network device may obtain the authorization information from another device (e.g., an authentication server associated with authorizing an HA cluster). For example, the first network device may send information indicating a determination to form an HA cluster with the second network device and information identifying the first network device to the other device, and may receive (e.g., in response) the authorization information from the other device.

In some implementations, the authorization information may include subscription information (e.g., subscription information associated with providing an HA service for the user device). The first network device may process the authorization information to identify the subscription information and may verify, based on one or more parameters of the subscription information, that the first network device is authorized to form an HA cluster (e.g., that the first network device is authorized to provide an HA service to the user device via the HA cluster). For example, the one or more parameters may include information indicating whether a subscription (e.g., for providing an HA service) is active. The first network device may determine, based on the information indicating whether the subscription is active, that the subscription is active, and may therefore verify that the first network device is authorized to form an HA cluster with the second network device (e.g., to provide an HA service).

As another example, the one or more parameters may indicate one or more capabilities of the first network device, such as a quantity of active sessions of the first network device, a capacity of the first network device, a throughput of the first network device, and/or the like. The first network device may determine, based on the one or more capabilities of the first network device, that the first network device is capable of forming an HA cluster (e.g., to provide an HA service) and may therefore verify that the first network device is authorized to form an HA cluster with the second network device (e.g., to provide an HA service).

As shown by reference number 115, the first network device may configure one or more communication links with the second network device to allow the first network device and the second network device to communicate. For example, the first network device may configure a first channel for a control link between the first network device and the second network device and may establish, via the first channel, the control link. The first channel and the control link may be wired, wireless (e.g., Wi-Fi), or a combination of wired and wireless. The control link may be used to route control information associated with the session of the user device between the first network device and the second network device. Additionally, or alternatively, the first network device may configure a second channel for a fabric link between the first network device and the second network device and establish, via the second channel, the fabric link. The second channel and the fabric link may be wired, wireless (e.g., Wi-Fi), or a combination of wired and wireless. The fabric link may be used to route network traffic associated with the session of the user device between the first network device and the second network device. The first network device and the second network device may, from time to time, exchange messages via the one or more communication links (e.g., control heart beat messages via the control link, data probe messages via the fabric link, and/or the like) to ensure that the one or more communication links are maintained.

As shown by reference number 120, the first network device may communicate with the second network device (e.g., via the one or more communication links) to initiate formation of an HA cluster. For example, the first network device may send (e.g., wirelessly, using an mPIM of the first network device) a request for information, via the control link of the one or more communication links, to the second network device. The second network device may generate, based on the request, a response (e.g., that indicates one or more capabilities of the second network device, such as a quantity of active sessions of the second network device, a capacity of the second network device, a throughput of the second network device, and/or the like) and may send (e.g., wirelessly, via an mPIN of the second network device), via the control link, the response to the first network device. The first network device may determine, based on the response, that the second network device is configured to be part of an HA cluster (e.g., that the one or more capabilities of the second network device are sufficient to allow the second network device to be part of an HA cluster).

In some implementations, the first network device and the second network device may communicate to establish respective roles for the first network device and the second network device in the HA cluster. For example, the first network device and the second network device may determine that the first network device is to be a primary network device for the HA cluster and that the second network device is to be a secondary network device for the HA cluster. A primary network device may be an active network device (e.g., an active node) that manages the session with the user device and transfers network traffic associated with the session to and from the user device. A secondary network device may be an inactive network device (e.g., an inactive node) that becomes active upon failure of the primary network device to manage the session with the user device and transfer network traffic associated with the session to and from the user device.

In some implementations, the first network device and/or the second network device may generate an HA cluster configuration that includes configuration information related to the HA cluster, such as information associated with the session with the user device, information associated with the one or more communication links, information associated with the respective roles of the first network device and the second network device in the HA cluster, and/or the like. The first network device and the second network device may communicate (e.g., via the one or more communication links) to ensure that each network device has a copy of the HA cluster configuration.

In some implementations, as part of forming the HA cluster, each network device may reboot (e.g., to configure each network device with the HA cluster configuration). As shown by reference number 125, the second network device may initiate a reboot with the HA cluster configuration. For example, the second network device may perform a procedure to shut down the second network device and then boot-up the second network device to allow the second network device to be configured with the HA cluster configuration.

Figure 1B:
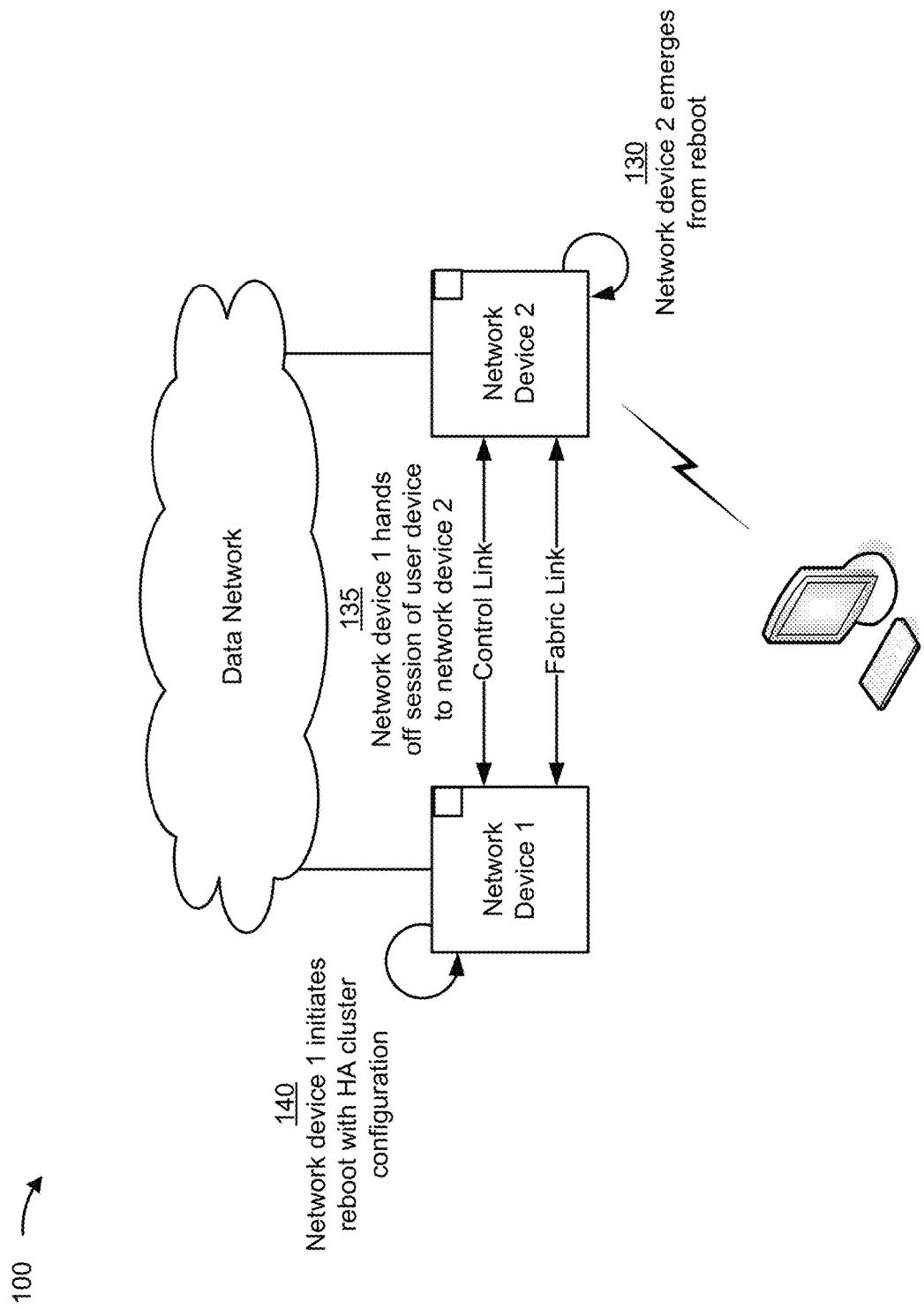

As shown in FIG. 1B and by reference number 130, the second network device may emerge from the reboot, which causes the second network device to be configured with the HA cluster configuration. After the second network device emerges from the reboot, the second network device may send a message (e.g., via the one or more communication links) to the first network device indicating that the second network device completed reboot and/or that the second network device is configured with the HA cluster configuration.

As shown by reference number 135, the first network device may hand off the session of the user device to the second network device. For example, the first network device may process the message from the second network device to determine that the second completed reboot and/or that the second network device is configured with the HA cluster configuration. The first network device may therefore hand off the session to the second network device. Handing off the session includes transferring management of the session to the second network device, causing the second network device to transfer network traffic associated with the session to and from the user device, and/or the like.

As shown by reference number 140, the first network device may initiate a reboot with the HA clustering configuration (e.g., in a similar manner as described herein in relation to FIG. 1A and reference number 125). For example, the first network device may perform a procedure to shut down the first network device and then boot-up the first network device, to allow the first network device to be configured with the HA cluster configuration.

Figure 1C:
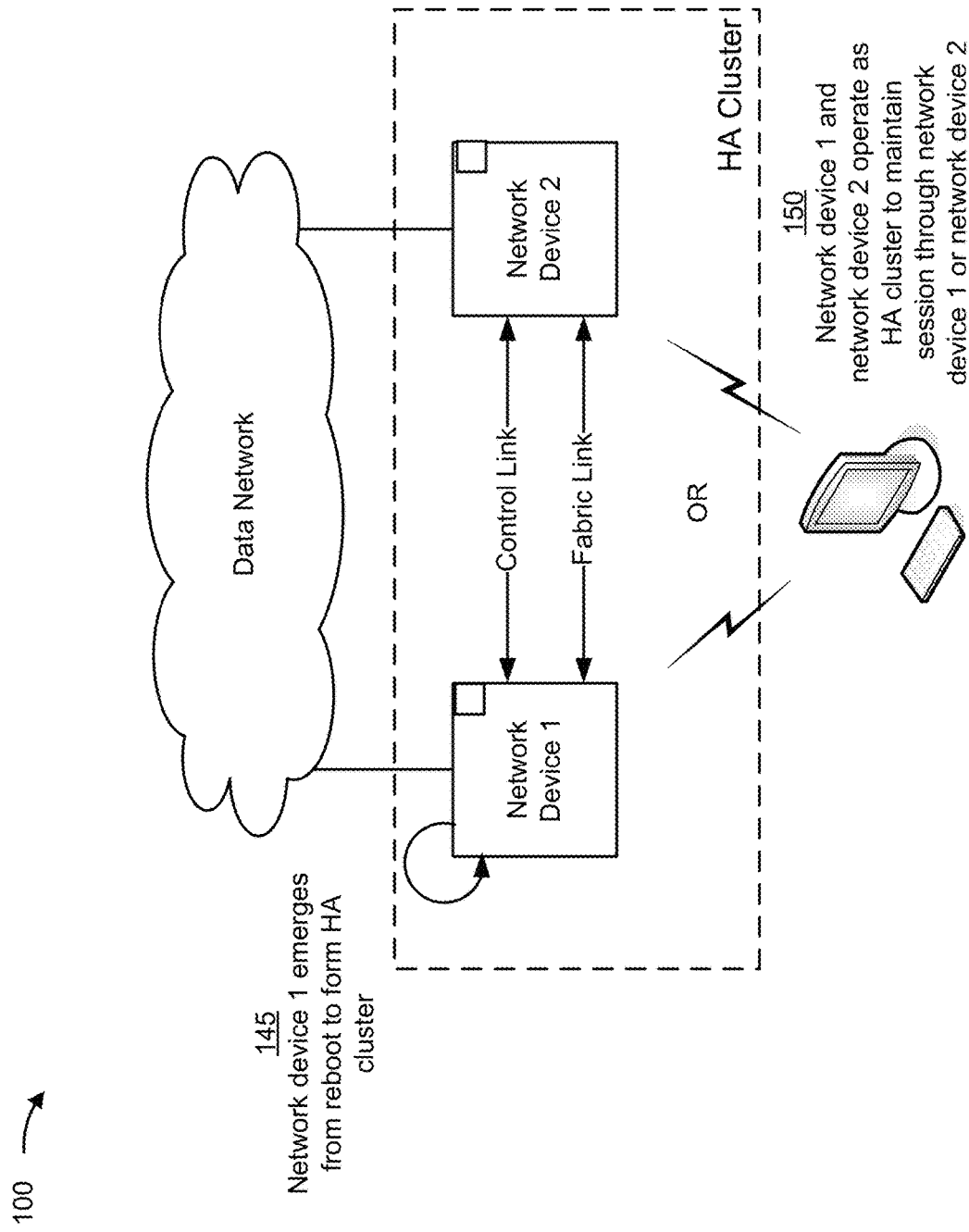

As shown in FIG. 1C and by reference number 145, the first network device may emerge from the reboot, which causes the first network device to be configured with the HA cluster configuration. In this way, formation of the HA cluster is finalized.

As shown by reference number 150, the first network device and the second network device may operate as the HA cluster to maintain the session of the user device through the first network device or the second network device. For example, the first network device, as the primary network device, may transmit network traffic associated with the session to and from the user device until the first network device encounters a failure (e.g., a system failure, a software failure, a hardware failure, and/or the like). At that point, the second network device, as the secondary network device, may take over and transmit the network traffic associated with the session to and from the user device.

In some implementations, to ensure a smooth transition from the first network device to the second network device when the first network device encounters a failure (and vice versa), the first network device may synchronize session information with the second network device (e.g., while the first network device and the second network device operate as the HA cluster). The first network device may synchronize the session information with the second network device via the one or more communication links (e.g., to permit the first network device or the second network device to route network traffic for the session via the high-availability cluster). In some implementations, the first network device may route network traffic associated with the session to the second network device, which routes the network traffic to the data network, to maintain the session. In this way, the HA cluster enables the user device to receive a high-availability service during the session.

Figure 1D:
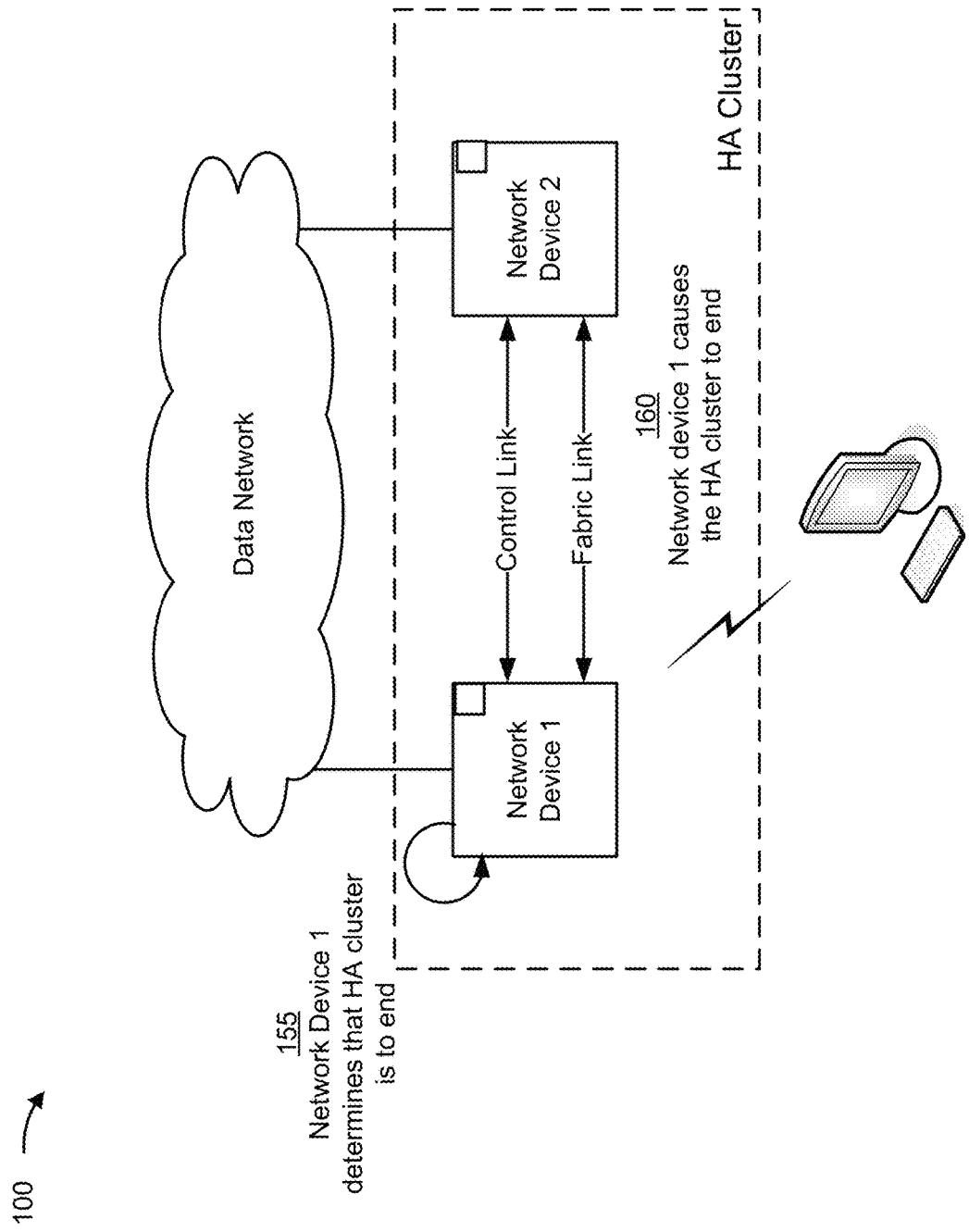

As shown in FIG. 1D and by reference number 155, the first network device may determine that the HA cluster is to end. For example, the first network device may identify a time period in the authorization information (e.g., that includes the subscription information, as described herein in relation to FIG. 1A and reference number 110) and determine that the HA cluster is to end when the time period expires. As another example, the user device may send a message to the first network device indicating that the HA cluster is to end (e.g., immediately, at a scheduled time, after a period of time, and/or the like). The first network device may process the message to determine that the HA cluster is to end (e.g., immediately, at the scheduled time, after the period of time expires, and/or the like). In an additional example, the first network device may monitor the HA cluster and may determine that the HA cluster is to end based on one or more characteristics of the HA cluster (e.g., when a quantity of active sessions of the HA cluster satisfies a threshold, a capacity of the HA cluster satisfies a threshold, a throughput of the HA cluster satisfies a threshold, and/or the like).

As shown by reference number 160, the first network device may cause the HA cluster to end. In some implementations, the first network device may cause the HA cluster to end at a time at which the first network device determined that the HA cluster is to end.

The first network device may cause the HA cluster to end by disconnecting the one or more communication links with the second network device. Additionally, or alternatively, the first network device may send a message to the second network device indicating that the HA cluster is to end. The message may indicate that the one or more communication links are to be disconnected, that the first network device and/or the second network device are to revert to a default configuration (e.g., the first network device and the second are to remove the HA cluster configuration), and/or the like. The second network device, based on the message, may disconnect the one or more communication links.

Figure 1E:
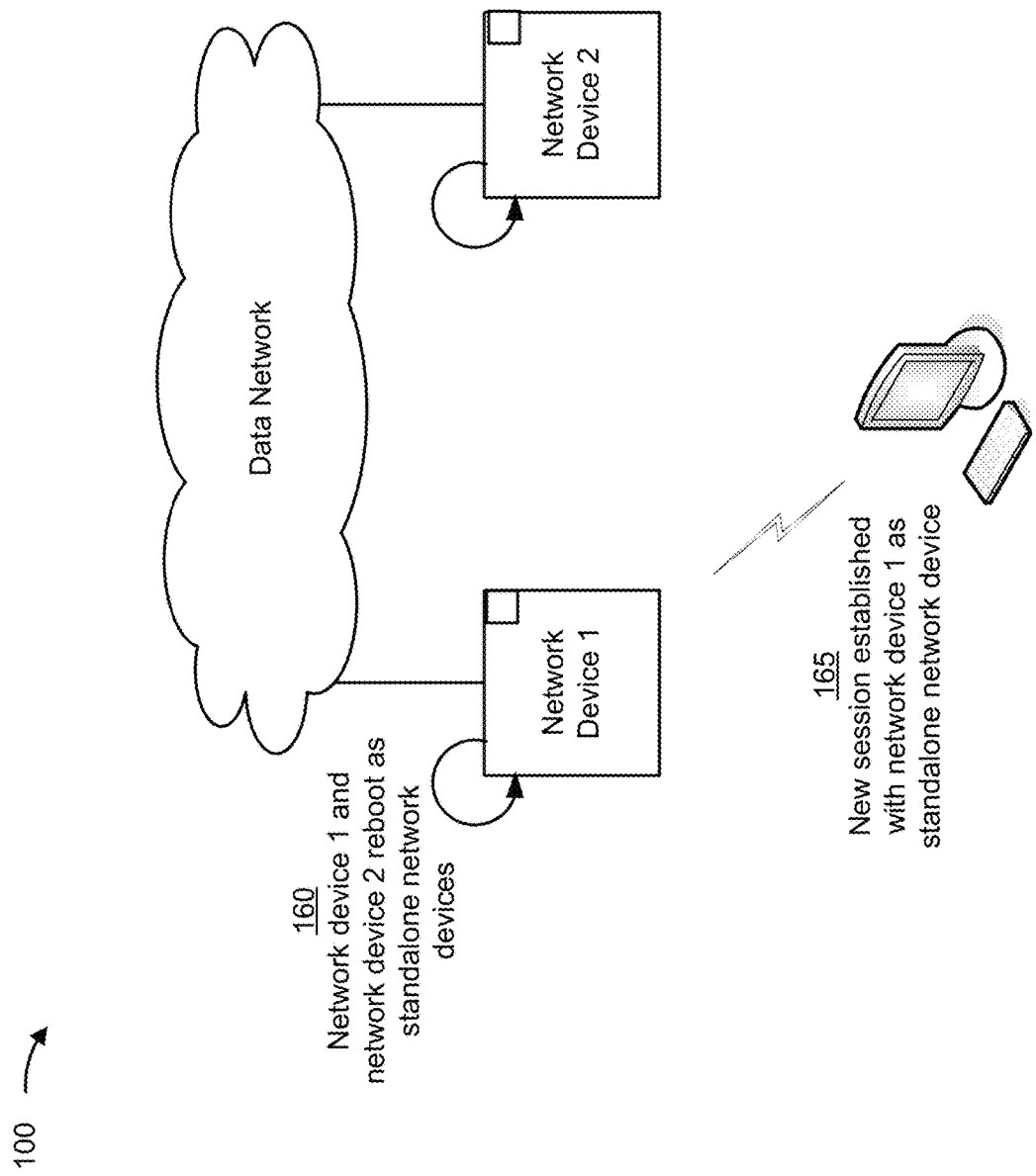

As shown in FIG. 1E and by reference number 160, the first network device and the second network device may reboot as standalone network devices (e.g., to remove the HA cluster configuration). In some implementations, the first network device and the second network device may reboot sequentially, so that one network device remains up while the other network device is rebooting. For example, prior to the first network device or the second network device disconnecting the one or more communication links, the first network device and the second network device may communicate to determine a time when each network device is to reboot. While one network device reboots, the other network device may maintain the session with the user device to allow network traffic to be transmitted to and from the user device. When the other network device reboots, the session may be terminated.

Accordingly, as shown by reference number 165, a new session may be established between the first network device (e.g., as a standalone node) and the user device (e.g., in a similar manner as described herein in relation to FIG. 1A and reference number 105). In some implementations, the user device or the first network device may initiate establishment of the new session.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
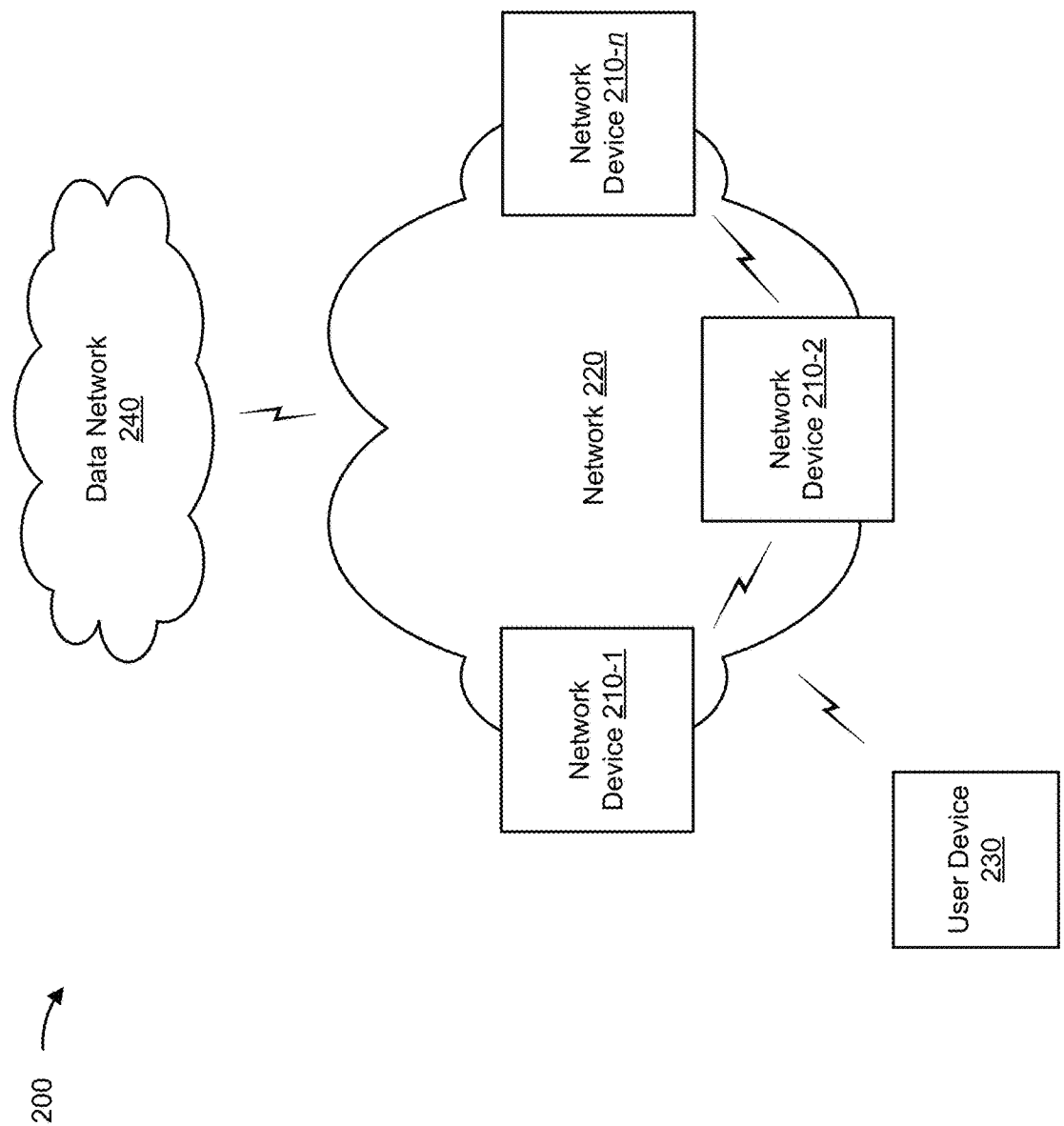
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-$n$ (n≥1) (hereinafter referred to collectively as "network devices 210," and individually as "network device 210"), a network 220, a user device 230, and a data network 240. Devices of environment 200 may interconnect via wired connections, wireless connections, or a combination of wired and wireless connections. In some implementations, network devices 210 may be linked and/or connected together to form a high-availability cluster. In some implementations, the high-availability cluster may include a plurality of nodes (e.g., two or more nodes) that are implemented by network devices 210.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center. In some implementations, network device 210 may include a wired or wireless physical interface module (PIM), a wired or wireless network interface controller (MC), a wired or wireless communication adapter, and/or another type of component that provides wired and/or wireless communication capabilities. For example, the network device may include a Wi-Fi mini-PIM (mPIM) for providing Wi-Fi communication capabilities.

Network 220 includes one or more wireless networks. For example, network 220 may include a cellular network (e.g., a long-term evolution (LTE) network, a code division multiple access (CDMA) network, a 3G network, a 4G network, a 5G network, another type of cellular network, etc.), a wireless local area network (WLAN) (e.g., a Wi-Fi network, an unlicensed spectrum wireless network, and/or the like), a wireless peer-to-peer (P2P) network (e.g., Wi-Fi direct, Bluetooth, and/or the like), and/or the like, and/or a combination of these or other types of networks.

User device 230 includes one or more devices capable of receiving, generating, storing, processing, and/or providing information. User device 230 may include a communication device and/or a computing device. For example, user device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 230 may communicate with one or more other devices of environment 200, as described elsewhere herein.

Data network 240 can include one or more wired and/or wireless networks. For example, data network 240 can include a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3B:
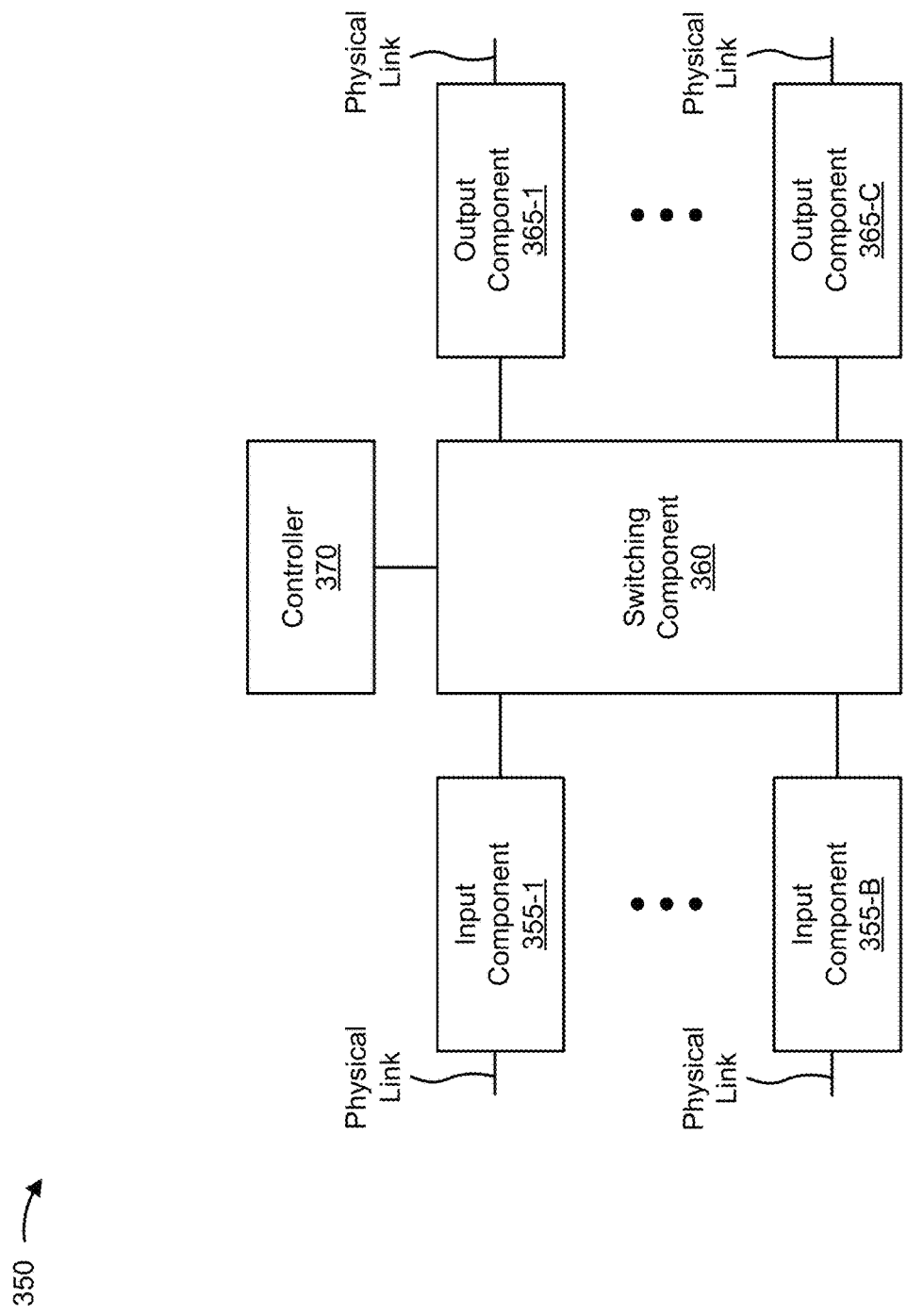

FIGS. 3A and 3B are diagrams of example components of one or more devices of FIG. 2. FIG. 3A is a diagram of example components of a device 300. In some implementations, device 300 may correspond to network device 210, user device 230, and/or the like. In some implementations, network device 210, user device 230, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to network device 210, user device 230, and/or the like. In some implementations, device 210 may include one or more devices 350 and/or one or more components of network device 210, user device 230, and/or the like. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flowchart of an example process 400 associated with high-availability networking as a service. In some implementations, one or more process blocks of FIG. 4 may be performed by a first network device (e.g., network device 210). In some implementations, one or more process blocks of FIG. 4 may be performed by another device or a group of devices separate from or including the first network device, such as one or more other network devices, and/or the like.

As shown in FIG. 4, process 400 may include receiving a request associated with forming a high-availability cluster with a second network device, wherein the first network device is associated with a session of a user device (block 410). For example, the first network device (e.g., using processor 310, memory 315, storage component 320, input component 325, output component 330, communication interface 335, input component 355, switching component 360, output component 365, controller 370, and/or the like) may receive a request associated with forming a high-availability cluster with a second network device, as described above. In some implementations, the first network device is associated with a session of a user device.

As further shown in FIG. 4, process 400 may include determining, based on authorization information associated with the first network device, that the first network device is authorized to form the high-availability cluster (block 420). For example, the first network device (e.g., using processor 310, memory 315, storage component 320, input component 325, output component 330, communication interface 335, input component 355, switching component 360, output component 365, controller 370, and/or the like) may determine, based on authorization information associated with the first network device, that the first network device is authorized to form the high-availability cluster, as described above.

As further shown in FIG. 4, process 400 may include configuring communication links with the second network device to form the high-availability cluster (block 430). For example, the first network device (e.g., using processor 310, memory 315, storage component 320, input component 325, output component 330, communication interface 335, input component 355, switching component 360, output component 365, controller 370, and/or the like) may configure communication links with the second network device to form the high-availability cluster, as described above.

As further shown in FIG. 4, process 400 may include synchronizing, with the second network device, session information associated with the session via the communication links (block 440). For example, the first network device (e.g., using processor 310, memory 315, storage component 320, input component 325, output component 330, communication interface 335, input component 355, switching component 360, output component 365, controller 370, and/or the like) may synchronize, with the second network device, session information associated with the session via the communication links, as described above.

As further shown in FIG. 4, process 400 may include routing session traffic of the session to the second network device and a data network to enable the user device to receive a high-availability service during the session (block 450). For example, the first network device (e.g., using processor 310, memory 315, storage component 320, input component 325, output component 330, communication interface 335, input component 355, switching component 360, output component 365, controller 370, and/or the like) may route session traffic of the session to the second network device and a data network to enable the user device to receive a high-availability service during the session, as described above.

Process 400 may include additional implementations, such as any single implementation or any combination of implementations described below and/or in connection with one or more other processes described elsewhere herein.

In a first implementation, the request is received from the user device.

In a second implementation, alone or in combination with the first implementation, the authorization information is stored in a data structure of the first network device.

In a third implementation, alone or in combination with one or more of the first and second implementations, the authorization information is obtained from an authentication server associated with authorizing the high-availability service.

In a fourth implementation, alone or in combination with one or more of the first through third implementations, determining that the first network device is authorized to form the high-availability cluster comprises identifying, from the authorization information, subscription information associated with providing the high-availability service for the user device, and verifying, based on parameters of the subscription information, that the first network device is authorized to provide the high-availability service to the user device via the high-availability cluster.

In a fifth implementation, alone or in combination with one or more of the first through fourth implementations, configuring the communication links comprises configuring a first wireless channel for a wireless control link between the first network device and the second network device; establishing, via the first wireless channel, the wireless control link; configuring a second wireless channel for a wireless fabric link between the first network device and the second network device, and establishing, via the second wireless channel, the wireless fabric link, where the wireless fabric link is used to route the session traffic between the first network device and the second network device.

In a sixth implementation, alone or in combination with one or more of the first through fifth implementations, routing the session traffic to the second network device and the data network comprises routing the session traffic to the second network device and the data network until a time period expires, wherein the time period is identified in the authorization information, and after the time period expires, disconnecting the communication links with the second network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with high-availability networking as a service. In some implementations, one or more process blocks of FIG. 5 may be performed by a first network device (e.g., network device 210). In some implementations, one or more process blocks of FIG. 5 may be performed by another device or a group of devices separate from or including the first network device, such as one or more other network devices, and/or the like.

As shown in FIG. 5, process 500 may include monitoring network traffic associated with the first network device (block 510). For example, the first network device (e.g., using processor 310, memory 315, storage component 320, input component 325, output component 330, communication interface 335, input component 355, switching component 360, output component 365, controller 370, and/or the like) may monitor network traffic associated with the first network device, as described above.

As further shown in FIG. 5, process 500 may include determining, based on a parameter of the network traffic satisfying a threshold, that the first network device is to form a high-availability cluster with a second network device (block 520). For example, the first network device (e.g., using processor 310, memory 315, storage component 320, input component 325, output component 330, communication interface 335, input component 355, switching component 360, output component 365, controller 370, and/or the like) may determine, based on a parameter of the network traffic satisfying a threshold, that the first network device is to form a high-availability cluster with a second network device, as described above.

As further shown in FIG. 5, process 500 may include configuring communication links with the second network device to form the high-availability cluster (block 530). For example, the first network device (e.g., using processor 310, memory 315, storage component 320, input component 325, output component 330, communication interface 335, input component 355, switching component 360, output component 365, controller 370, and/or the like) may configure communication links with the second network device to form the high-availability cluster, as described above.

As further shown in FIG. 5, process 500 may include synchronizing, with the second network device, session information associated with the network traffic via the communication links (block 540). For example, the first network device (e.g., using processor 310, memory 315, storage component 320, input component 325, output component 330, communication interface 335, input component 355, switching component 360, output component 365, controller 370, and/or the like) may synchronize, with the second network device, session information associated with the network traffic via the communication links, as described above.

As further shown in FIG. 5, process 500 may include routing the network traffic to the second network device and a data network to enable one or more sessions to be maintained via a high-availability service (block 550). For example, the first network device (e.g., using processor 310, memory 315, storage component 320, input component 325, output component 330, communication interface 335, input component 355, switching component 360, output component 365, controller 370, and/or the like) may route the network traffic to the second network device and a data network to enable one or more sessions to be maintained via a high-availability service, as described above.

Process 500 may include additional implementations, such as any single implementation or any combination of implementations described below and/or in connection with one or more other processes described elsewhere herein.

In a first implementation, the parameter comprises at least one of a quantity of user devices that are associated with the network traffic, a quantity of sessions that are associated with the network traffic, or a performance characteristic associated with the first network device routing the network traffic.

In a second implementation, alone or in combination with the first implementation, configuring the communication links includes configuring a first wireless channel for a wireless control link between the first network device and the second network device; establishing, via the first wireless channel, the wireless control link; configuring a second wireless channel for a wireless fabric link between the first network device and the second network device; and establishing, via the second wireless channel, the wireless fabric link, wherein the wireless fabric link is used to route the network traffic between the first network device and the second network device.

In a third implementation, alone or in combination with one or more of the first and second implementations, process 500 includes, prior to synchronizing the session information, causing the second network device to perform a reboot to form the high-availability cluster; performing a handoff of the network traffic to the second network device; and rebooting to form the high-availability cluster to permit the session information to be synchronized within the high-availability cluster.

In a fourth implementation, alone or in combination with one or more of the first through third implementations, configuring the communication links includes establishing a role of the first network device for managing the session via the high-availability cluster, and establishing a role of the second network device for managing the session via the high-availability cluster.

In a fifth implementation, alone or in combination with one or more of the first through fourth implementations, process 500 includes jointly establishing, with the second network device and via a wireless control link of the communication links, a primary node for the high-availability cluster and a secondary node for the high-availability cluster In a sixth implementation, alone or in combination with one or more of the first through fifth implementations, routing the network traffic to the second network device and the data network includes routing the network traffic to the second network device and the data network until a time period expires, wherein the time period is identified in authorization information associated with the first network device establishing the high-availability cluster for the network traffic; and after the time period expires, disconnecting the communication links with the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
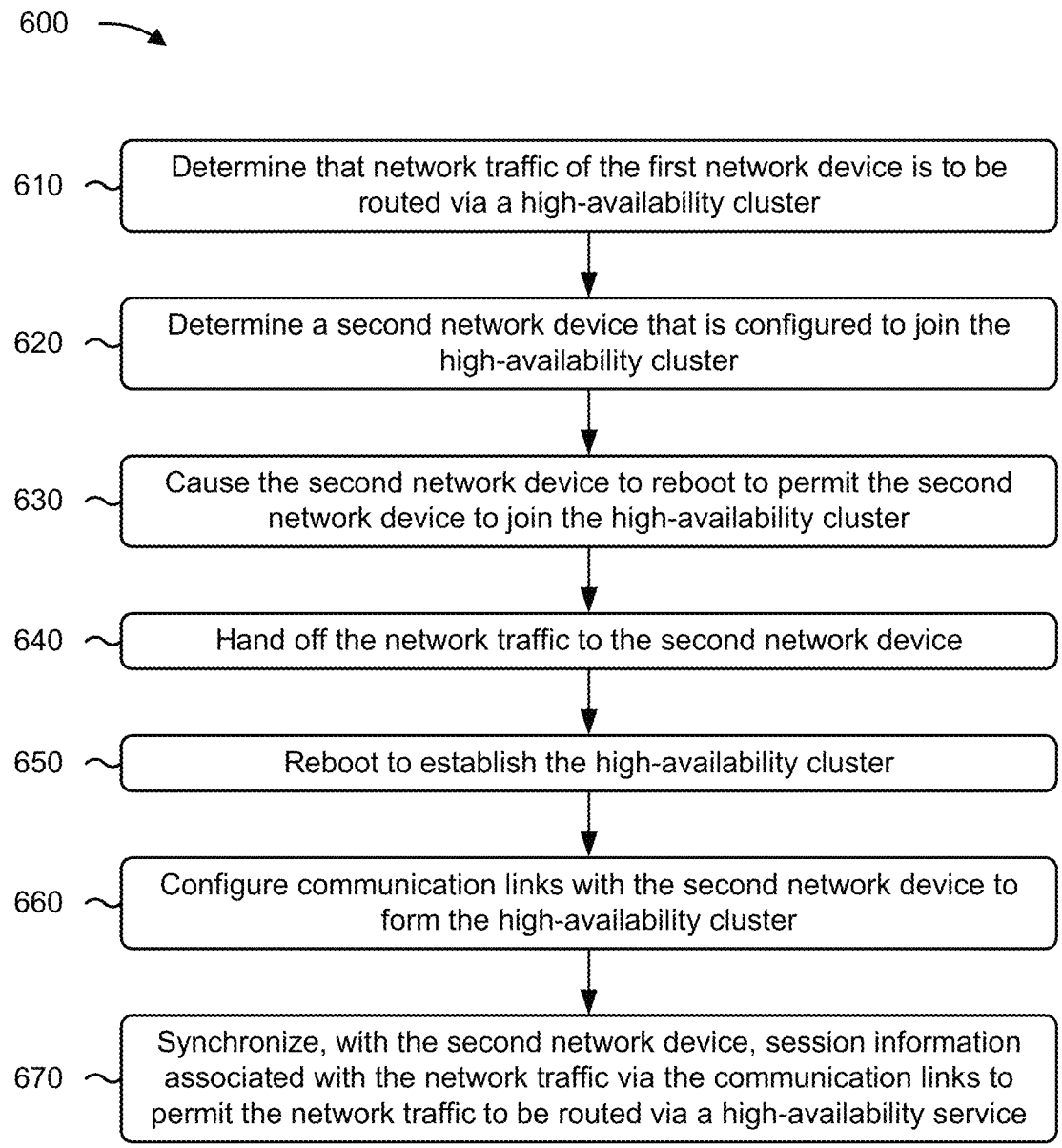

FIG. 6 is a flowchart of an example process 600 associated with high-availability networking as a service. In some implementations, one or more process blocks of FIG. 6 may be performed by a first network device (e.g., first network device 210). In some implementations, one or more process blocks of FIG. 6 may be performed by another device or a group of devices separate from or including the first network device, such as one or more other network devices, and/or the like.

As shown in FIG. 6, process 600 may include determining that network traffic of the first network device is to be routed via a high-availability cluster (block 610). For example, the first network device (e.g., using processor 310, memory 315, storage component 320, input component 325, output component 330, communication interface 335, input component 355, switching component 360, output component 365, controller 370, and/or the like) may determine that network traffic of the first network device is to be routed via a high-availability cluster, as described above.

As further shown in FIG. 6, process 600 may include determining a second network device that is configured to join the high-availability cluster (block 620). For example, the first network device (e.g., using processor 310, memory 315, storage component 320, input component 325, output component 330, communication interface 335, input component 355, switching component 360, output component 365, controller 370, and/or the like) may determine a second network device that is configured to join the high-availability cluster, as described above.

As further shown in FIG. 6, process 600 may include causing the second network device to reboot to permit the second network device to join the high-availability cluster (block 630). For example, the first network device (e.g., using processor 310, memory 315, storage component 320, input component 325, output component 330, communication interface 335, input component 355, switching component 360, output component 365, controller 370, and/or the like) may cause the second network device to reboot to permit the second network device to join the high-availability cluster, as described above.

As further shown in FIG. 6, process 600 may include handing off the network traffic to the second network device (block 640). For example, the first network device (e.g., using processor 310, memory 315, storage component 320, input component 325, output component 330, communication interface 335, input component 355, switching component 360, output component 365, controller 370, and/or the like) may hand off the network traffic to the second network device, as described above.

As further shown in FIG. 6, process 600 may include rebooting to establish the high-availability cluster (block 650). For example, the first network device (e.g., using processor 310, memory 315, storage component 320, input component 325, output component 330, communication interface 335, input component 355, switching component 360, output component 365, controller 370, and/or the like) may reboot to establish the high-availability cluster, as described above.

As further shown in FIG. 6, process 600 may include configuring communication links with the second network device to form the high-availability cluster (block 660). For example, the first network device (e.g., using processor 310, memory 315, storage component 320, input component 325, output component 330, communication interface 335, input component 355, switching component 360, output component 365, controller 370, and/or the like) may configure communication links with the second network device to form the high-availability cluster, as described above.

As further shown in FIG. 6, process 600 may include synchronizing, with the second network device, session information associated with the network traffic via the communication links to permit the network traffic to be routed via a high-availability service (block 670). For example, the first network device (e.g., using processor 310, memory 315, storage component 320, input component 325, output component 330, communication interface 335, input component 355, switching component 360, output component 365, controller 370, and/or the like) may synchronize, with the second network device, session information associated with the network traffic via the communication links, to permit the network traffic to be routed via a high-availability service, as described above.

Process 600 may include additional implementations, such as any single implementation or any combination of implementations described below and/or in connection with one or more other processes described elsewhere herein.

In a first implementation, determining that the network traffic is to be routed via the high-availability cluster includes detecting that a parameter associated with routing the network traffic via the first network device satisfies a threshold; and determining that the network traffic is to be routed via the high-availability cluster based on the parameter satisfying the threshold.

In a second implementation, alone or in combination with the first implementation, determining that the network traffic is to be routed via the high-availability cluster includes receiving a user input that includes a request to route the network traffic via the high-availability cluster, and determining that the network traffic is to be routed via the high-availability cluster based on the request.

In a third implementation, alone or in combination with one or more of the first and second implementations, identifying the second network device includes requesting, via a control link of the communication links, the second network device to establish the high-availability cluster; and determining that the second network device is configured to join the high-availability cluster based on a response from the second network device.

In a fourth implementation, alone or in combination with one or more of the first through third implementations, the communication links are wireless communication links.

In a fifth implementation, alone or in combination with one or more of the first through fourth implementations, process 600 includes routing, via the high-availability cluster, the network traffic until a particular time period expires; after the time period expires, determining, based on a parameter associated with the network traffic, whether to continue to route the network traffic via the high-availability cluster; and routing, based on whether the parameter indicates that the network traffic is to be routed via the high-availability cluster the network traffic via one of the first network device, the second network device, or the high-availability cluster.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first network device, a request associated with forming a high-availability cluster with a second network device,
     wherein the first network device is associated with a session of a user device;
   determining, by the first network device and based on authorization information associated with the first network device, that the first network device is authorized to form the high-availability cluster;
   configuring, by the first network device, communication links with the second network device to form the high-availability cluster,
     wherein configuring the communication links comprises:

configuring a first wireless channel for a wireless control link between the first network device and the second network device;
establishing, via the first wireless channel, the wireless control link;
configuring a second wireless channel for a wireless fabric link between the first network device and the second network device; and
establishing, via the second wireless channel, the wireless fabric link,
wherein the wireless fabric link is used to route session traffic between the first network device and the second network device;
synchronizing, by the first network device and with the second network device, session information associated with the session via the communication links; and
routing, by the first network device, the session traffic of the session to the second network device and a data network to enable the user device to receive a high-availability service during the session.

2. The method of claim 1, wherein the request is received from the user device.

3. The method of claim 1, wherein the authorization information is stored in a data structure of the first network device.

4. The method of claim 1, wherein the authorization information is obtained from an authentication server associated with authorizing the high-availability service.

5. The method of claim 1, wherein determining that the first network device is authorized to form the high-availability cluster comprises:
identifying, from the authorization information, subscription information associated with providing the high-availability service for the user device; and
verifying, based on parameters of the subscription information, that the first network device is authorized to provide the high-availability service to the user device via the high-availability cluster.

6. The method of claim 1, wherein routing the session traffic to the second network device and the data network comprises:
routing the session traffic to the second network device and the data network until a time period expires,
wherein the time period is identified in the authorization information; and
after the time period expires, disconnecting the communication links with the second network device.

7. A first network device, comprising:
one or more memories; and
one or more processors to:
monitor network traffic associated with the first network device;
determine, based on a parameter of the network traffic satisfying a threshold, that the first network device is to form a high-availability cluster with a second network device;
configure communication links with the second network device to form the high-availability cluster;
synchronize, with the second network device, session information associated with the network traffic via the communication links; and
route the network traffic to the second network device and a data network to enable one or more sessions to be maintained via a high-availability service.

8. The first network device of claim 7, wherein the parameter comprises at least one of:
a quantity of user devices that are associated with the network traffic,
a quantity of sessions that are associated with the network traffic, or
a performance characteristic associated with the first network device routing the network traffic.

9. The first network device of claim 7, wherein the one or more processors, when configuring the communication links, are to:
configure a first wireless channel for a wireless control link between the first network device and the second network device;
establish, via the first wireless channel, the wireless control link;
configure a second wireless channel for a wireless fabric link between the first network device and the second network device; and
establish, via the second wireless channel, the wireless fabric link,
wherein the wireless fabric link is used to route the network traffic between the first network device and the second network device.

10. The first network device of claim 7, wherein the one or more processors are further to:
prior to synchronizing the session information, cause the second network device to perform a reboot to form the high-availability cluster;
perform a handoff of the network traffic to the second network device; and
reboot to form the high-availability cluster to permit the session information to be synchronized within the high-availability cluster.

11. The first network device of claim 7, wherein the one or more processors, when configuring the communication links, are to:
establish a role of the first network device for managing the session via the high-availability cluster; and
establish a role of the second network device for managing the session via the high-availability cluster.

12. The first network device of claim 7, wherein the one or more processors are further to jointly establish, with the second network device and via a wireless control link of the communication links, a primary node for the high-availability cluster and a secondary node for the high-availability cluster.

13. The first network device of claim 7, wherein the one or more processors, when routing the network traffic to the second network device and the data network, are to:
route the network traffic to the second network device and the data network until a time period expires,
wherein the time period is identified in authorization information associated with the first network device establishing the high-availability cluster for the network traffic; and
after the time period expires disconnecting the communication links with the second network device.

14. A non-transitory computer-readable medium storing instructions, the instructions comprising:
one or more instructions that, when executed by one or more processors of a first network device, cause the one or more processors to:
determine that network traffic of the first network device is to be routed via a high-availability cluster;
identify a second network device that is configured to join the high-availability cluster;

cause the second network device to reboot to permit the
second network device to join the high-availability
cluster;
hand off the network traffic to the second network
device;
reboot to establish the high-availability cluster;
configure communication links with the second network device to form the high-availability cluster; and
synchronize, with the second network device, session
information associated with the network traffic via
the communication links to permit the network traffic
to be routed via a high-availability service.

15. The non-transitory computer-readable medium of claim 14, wherein the one or more instructions, that cause the one or more processors to determine that the network traffic is to be routed via the high-availability cluster, cause the one or more processors to:
   detect that a parameter associated with routing the network traffic via the first network device satisfies a threshold; and
   determine that the network traffic is to be routed via the high-availability cluster based on the parameter satisfying the threshold.

16. The non-transitory computer-readable medium of claim 14, wherein the one or more instructions, that cause the one or more processors to determine that the network traffic is to be routed via the high-availability cluster, cause the one or more processors to:
   receive a user input that includes a request to route the network traffic via the high-availability cluster; and
   determine that the network traffic is to be routed via the high-availability cluster based on the request.

17. The non-transitory computer-readable medium of claim 14, wherein the one or more instructions, that cause the one or more processors to identify the second network device, cause the one or more processors to:
   request, via a control link of the communication links, the second network device to establish the high-availability cluster; and
   determine that the second network device is configured to join the high-availability cluster based on a response from the second network device.

18. The non-transitory computer-readable medium of claim 14, wherein the communication links are wireless communication links.

19. The non-transitory computer-readable medium of claim 14, wherein the one or more instructions, when executed, further cause the one or more processors to:
   route, via the high-availability cluster, the network traffic until a time period expires;
   after the time period expires, determine, based on a parameter associated with the network traffic, whether to continue to route the network traffic via the high-availability cluster; and
   route, based on whether the parameter indicates that the network traffic is to be routed via the high-availability cluster, the network traffic via one of:
      the first network device,
      the second network device, or
      the high-availability cluster.

20. The method of claim 1, wherein routing the session traffic of the session to the second network device and the data network comprises:
   routing the session traffic to the second network device and the data network until a time period expires,
      wherein the time period is identified in authorization information associated with the first network device establishing the high-availability cluster for the session traffic; and
   after the time period expires, disconnecting the communication links with the second network device.

\* \* \* \* \*